United States Patent Office 3,620,032
Patented Nov. 16, 1971

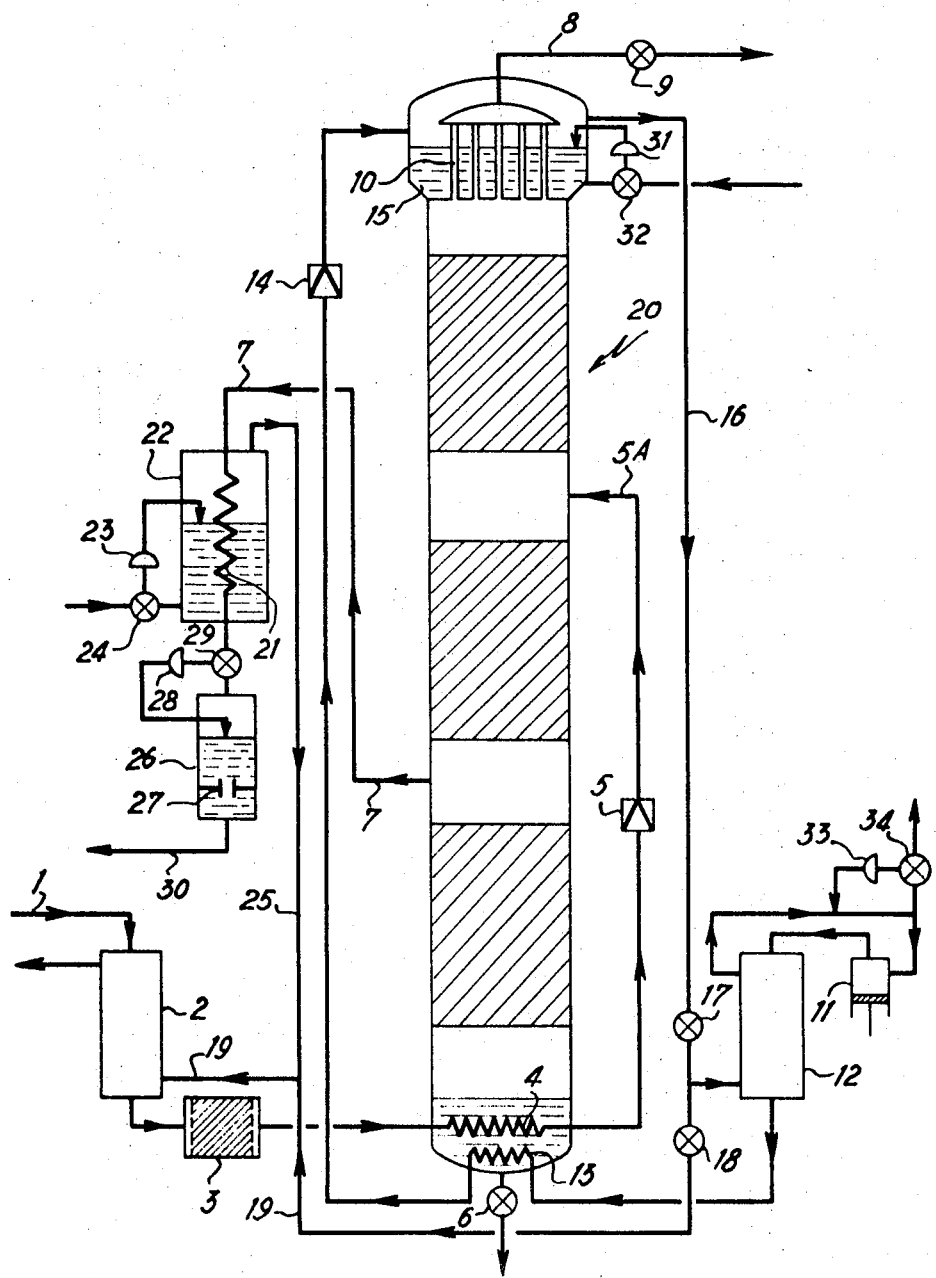

3,620,032
METHOD FOR PRODUCING HIGH-PURITY OXYGEN FROM COMMERCIALLY PURE OXYGEN FEED-STREAM
Guy Simonet, Paris, France, assignor to L'Air Liquide Société Anonyme pour l'Etude et l'Exploitation des Procedes Georges Claude
Filed May 16, 1968, Ser. No. 729,587
Int. Cl. F25j 3/02, 3/08
U.S. Cl. 62—28                                1 Claim

ABSTRACT OF THE DISCLOSURE

A method for producing high-purity oxygen in the liquid state through rectifying medium-purity oxygen, in which medium-purity oxygen is subjected to rectification in a column from which oxygen gas is bled below the feed, but well above the sump, the said gas being then liquefied, preferably in a constant-level liquid-nitrogen bath condenser, then withdrawn through a vessel with a flow regulator.

---

The present invention relates to a method for producing high-purity oxygen, especially with a very low hydrocarbon content, e.g. less than 0.2 volume per million (v.p.m.), such purity being required for some industrial or medical uses.

Industrial medium-purity oxygen (98–99.5%), that is, commercially pure oxygen is usually obtained through rectifying liquefied atmospheric air after elimination of the water vapor and carbon dioxide contained in the latter. In this rectification, oxygen is the tail product, except for some rare gases such as krypton and zenon. Nitrogen and argon, which are comparatively volatile, are usually separated from the oxygen in a device with two rectifying columns, which are thermally associated and operate under different pressures. Oxygen is withdrawn in the liquid or gaseous state at the bottom of the low-pressure column. For storage, distribution, use and other purposes, the production of liquid oxygen is often advantageous. On the other hand, some impurities, such as nitrogen, arogn and krypton, as well as some hydrocarbons which cannot be entirely eliminated through chemical purification, are troublesome for some industrial or medical uses which imperatively require a very high purity.

The impurities which are less volatile than oxygen, such as krypton, have a tendency to accumlate in the oxygen when it is withdrawn in the liquid state from the sump of the low-pressure rectifying column. They can be largely eliminated through partial vaporisation of the liquid oxygen, the gas fraction being collected and he impurities remaining in the liquid fraction, which is used for applications with less severe requirements. However, the benefits of the liquid state withdrawal are thus lost.

The method of this invention makes it possible to obtain oxygen with an even higher purity, containing only a few v.p.m. of impurities, in the liquid state. Its main feature is that pure gaseous oxygen is bled from a rectifying column fed with medium purity oxygen, below the feed, but well above the sump, and subsequently liquefied through heat exchange with an auxiliary liquid fluid, preferably with liquid nitrogen.

The invention may further involve the following embodiments, either separately or in combination:

(a) The flow rate of pure liquid oxygen is kept uniform by the use of a constant-level bath of an auxiliary liquid fluid;

(b) The flow rate of pure liquid oxygen is kept uniform through maintaining a constant level of liquid oxygen above a calibrated opening.

Under such conditions, the less volatile impurities are concentrated in the sump, which is heated in a known manner, for instance by the heat of liquefaction of the impure oxygen feeding the rectifying column. The impurities are continuously bled from the sump in a liquid oxygen bleed, which can be used in applciations in which very high purity is not required.

On the other hand, the liquefaction of the high-purity oxygen through heat exchange in a controlled-level vaporiser and the control of the bleed rate by maintaining the head of liquid oxygen above a calibrated opening make it possible to maintain a perfectly uniform withdrawal rate of high-purity oxygen gas and to ensure a perfectly uniform operation of the rectifying column, and thus to maintain a perfectly uniform purity of the liquid oxygen produced.

There is described hereafter, as a non-limitative example and with reference to the appended drawing, an apparatus for the production of high-purity oxygen, containing less than 5 v.p.m. impurities (mainly argon), through rectifying medium-purity oxygen.

From a known air-separation device, oxygen gas is bled under 1.2 absolute bars pressure approximately, compressed to 6.5 absolute bars approximately, then freed of the major part of its hydrocarbons in a known manner, through catalytic oxidation, then dehydrated through cooling and adsorption, in devices which are not shown, as they are no part of this invention. The oxygen thus purified still contains the following impurities:

|   | V.p.m. |
|---|---|
| Argon | 3,000–5,000 |
| Nitrogen | 50–500 |
| Krypton | 8–22 |
| Hydrocarbons | 5–10 |

The oxygen introduced through duct 1 is then cooled almost down to its temperature of liquefaction by cold nitrogen gas in exchanger 2. It is then freed of its last traces of moisture and of a small amount of residual hydrocarbons in an adsorbing bed diagrammatically shown at 3. It is then liquefied in coil 4 immersed in the sump of column 20, which operates under 1.2 absolute bars approximately. Once liquefied in the coil, the impure oxygen is expanded in valve 5 and led through duct 5A into the middle part of column 20, which contains either rectifying plates or a filling such as Dixon or Raschig rings or a similar filling.

The sump of the column is mainly heated, as has been said, by the liquefaction of the impure oxygen. It is also incvidentally heated by nitrogen liquefying, as indicated below.

The oxygen containing the less volatile impurities (hydrocarbons, krypton, etc.) collects in the liquid state in the sump of the column, from which it is extracted (preferably continuously) through conduit 6. Through valve 7, a few plates above the sump, high-purity oxygen gas is extracted continuously, while the more volatile impurities (mainly nitrogen and argon), with a certain amount of oxygen, are extracted in the gaseous state from the top of the column, through duct 8 provided with control valve 9. The refluxing liquid in the upper part of the column is formed by a condenser 10, cooled by a liquid-nitrogen bath 15 under one absolute bar approximately. This liquid nitrogen issues from a cooling cycle involving compressor 11, exchanger 12 and coil 13, immersed in the impure liquid oxygen in the sump of the column, in which the nitrogen is liquefied. The latter is then expanded in valve 14 to 1 absolute bar approximately, and sent to liquid-nitrogen bath 15 around the tubes of condenser 10, thus ensuring partial condensation and refluxing of the vapors ascending through the column.

The nitrogen vapors formed in condenser 10 are sent back through duct 16 and valve 17 to the suction side of compressor 11, after having been heated up in exchanger 12. A portion is bled through valve 18 and duct 19 to exchanger 2, where the impure oxygen is cooled, and recirculated to a liquefying device (not shown).

High purity oxygen bled through duct 7 in the gaseous state from rectifying column 20 is liquefied in coil 21, immersed in the liquid-nitrogen bath of condenser 22.

The uniform flow rate and impurities content of the withdrawn liquid oxygen are ensured by the following devices:

The level of the liquid-nitrogen bath of condenser 22 is maintained by regulator 23 (e.g. a float regulator) controlling liquid-nitrogen feed valve 24. The nitrogen vaporised in condenser 22 is combined through duct 25 with the nitrogen stream withdrawn through heat exchanger 2 counter-current to the impure oxygen to be rectified.

The oxygen liquefied with a uniform flow rate in condenser 22 is then bled through vessel 26 with calibrated opening 27. The level of liquid oxygen in this vessel is maintained by regulator 28 (e.g. a float regulator) controlling the vessel feed valve 29. Pure liquid oxygen is then sent to storage through duct 30.

Moreover, the reflux rate in the column is maintained by regulator 31 (e.g. a float regulator) which maintains the level of liquid nitrogen around condenser 10, through control of liquid nitrogen feed valve 32, with a flow rate equal to the flow rate of the nitrogen stream withdrawn through valve 18. Finally, the vaporisation rate in the sump of column 20 and the flow rate of the stream of liquid nitrogen sent to condenser 10 are kept uniform through regulator 33, which bleeds more or less nitrogen from the cycle at the feed of compressor 10 through valve 34 according to the inlet pressure to the said compressor.

The following table gives the residual contents of impurities in the high-purity oxygen obtained by the method of the invention in an installation such as described above, treating approximately 45 m.³/h. NTP (1,600 cu. ft./h.) impure oxygen, the composition of which was disclosed above, and giving approximately 40 m.³/h. (1,400 cu. ft./h.) high-purity oxygen, with a cycle stream of approximately 125–160 m.³/h. (4,400–5,650 cu. ft./h.) nitrogen.

Impurities in oxygen product

| | V.p.m. |
|---|---|
| Nitrogen | <1 |
| Argon | 5 |
| Krypton | 0–0.3 |
| Hydrocarbons | 0.1 |

It should be understood that various changes can be brought to the above-described installation without exceeding the scope of the invention. More particularly, the production of cold required by its operation may be ensured by other means, for instance by a cooling cycle involving expansion with external work. The oxygen to be purified may undergo a preliminary cooling through heat exchange with an auxiliary cooling fluid, or may be freed of the major portion of its hydrocarbons otherwise than through catalytic oxidation e.g. through adsorption.

What I claim is:

1. A method for obtaining a product stream of high purity liquefied oxygen from a feed stream of commercially pure gaseous oxygen, comprising compressing and cooling said feed stream, passing said cooled feed stream through the sump of a rectification column having an overhead condenser and means having a plurality of theoretical plates providing multiple surfaces for gas-liquid contact in the column thereby to condense the feed stream, expanding said condensed feed stream, introducing said expanded feed stream into said rectification column at a point intermediate the ends of the rectification column both above and below a plurality of theoretical plates thereby to produce a gaseous overhead product and a liquid bottoms product that collects in said sump, heat exchanging said gaseous overhead product with a cold liquid in said condenser thereby to condense said overhead product, withdrawing from said column said product stream in the gaseous state at a point located below the feed point but above said sump, said withdrawal point being separated from both the feed point and the sump respectively by a few theoretical plates, heat exchanging at a constant flow rate said gaseous product stream with liquid identical to said cold liquid in a condenser separate from said overhead condenser thereby to liquefy said product stream, withdrawing said liquefied product stream at a constant rate, compressing the vapor from said overhead condenser, heat exchanging said compressed vapor with the liquid in said sump thereby to condense said vapor, expanding said condensed vapor, and introducing said expanded vapor into said overhead condenser.

References Cited

UNITED STATES PATENTS

| | | | |
|---|---|---|---|
| 2,729,954 | 1/1956 | Etienne | 62—31 |
| 3,073,130 | 1/1963 | Becker | 62—29 |
| 3,363,426 | 1/1968 | Stoklosinski | 62—30 |
| 3,363,427 | 1/1968 | Blanchard | 62—40 |

NORMAN YUDKOFF, Primary Examiner

A. F. PURCELL, Assistant Examiner

U.S. Cl. X.R.

62—40, 22